No. 780,492. PATENTED JAN. 24, 1905.
F. E. BOUTELLE.
SPOON.
APPLICATION FILED JULY 23, 1904.
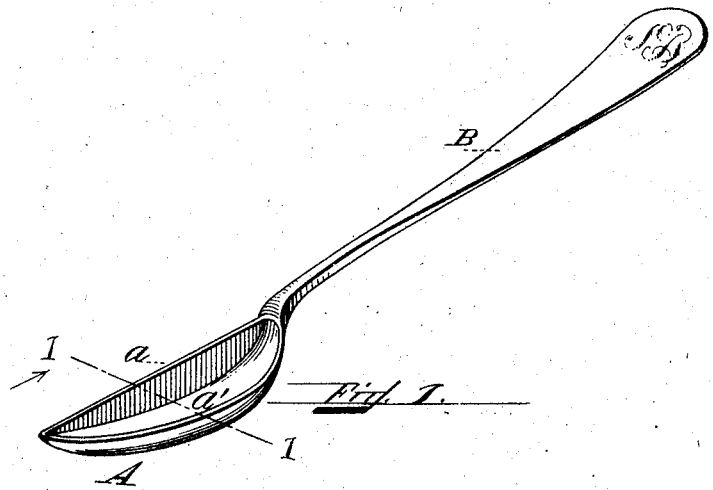
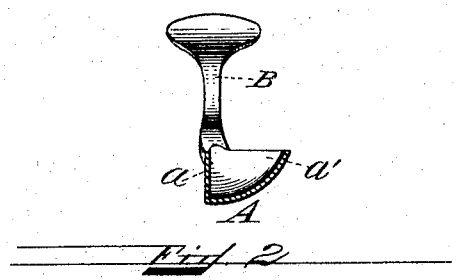

No. 780,492. Patented January 24, 1905.

UNITED STATES PATENT OFFICE.

FRANCES E. BOUTELLE, OF FITCHBURG, MASSACHUSETTS.

SPOON.

SPECIFICATION forming part of Letters Patent No. 780,492, dated January 24, 1905.

Application filed July 23, 1904. Serial No. 217,878.

*To all whom it may concern:*

Be it known that I, FRANCES E. BOUTELLE, a citizen of the United States, residing at Fitchburg, in the county of Worcester and State of Massachusetts, have invented a certain new and useful Improvement in Spoons, of which the following is a specification.

The object of my invention is to provide a spoon especially designed for use as a measure of liquids, medicines, and cooking materials, and, further, for use as a fruit-spoon to remove the contents of oranges, grape-fruit, and the like. Its capacity is exactly one-half of that of a spoon, and its peculiar form causes it to be conspicuous and easily found among other household utensils.

Figure 1 is a perspective view of my spoon, and Fig. 2 is a cross-section of said spoon on line 1 1 of Fig. 1.

In the drawings illustrating my invention and the best mode now known to me of embodying said invention, A is a bowl, while B is a handle connected therewith in the usual manner. The bowl A is made up of a straight portion $a$, lying in the plane of the longitudinal axis of the spoon, said plane being at right angles to that of the handle, and also of a shallow ovoidal shell portion $a'$, joined to said straight portion $a$ and lying at one side of said axis. In short, in capacity and appearance my invention is half a standard teaspoon. Obviously the plane and curved surfaces of the bowl A converge to a sharp point, and thus make the spoon most serviceable as a fruit-spoon to sever and remove the edible portions and juices, as from orange-sections.

What I claim is—

A spoon made up of a bowl and a handle; said bowl consisting of a straight body portion lying in the plane of the longitudinal axis of the spoon, said plane being at right angles to that of the handle; and a shell portion connected with said straight portion and lying at one side of said axis.

In testimony whereof I affix my signature in presence of two witnesses.

FRANCES E. BOUTELLE.

Witnesses:
 KENDALL F. CROCKER,
 RALPH U. BOUTELLE.